United States Patent

Brownlee

Patent Number: 6,034,606
Date of Patent: *Mar. 7, 2000

[54] OXYGEN ENRICHMENT SYSTEM FOR WHEELED VEHICLES CROSS-REFERENCE TO RELATED APPLICATIONS

[76] Inventor: David W. Brownlee, 826 Eleventh St., Oakmont, Pa. 15139

[*] Notice: This patent is subject to a terminal disclaimer.

[21] Appl. No.: 09/300,859

[22] Filed: Apr. 28, 1999

Related U.S. Application Data

[63] Continuation-in-part of application No. 09/135,927, Jan. 18, 1998, Pat. No. 5,910,773.

[51] Int. Cl.$^7$ .................................................. G08B 23/00
[52] U.S. Cl. ............................................ 340/576; 180/272
[58] Field of Search .................................. 340/576, 575; 180/272; 128/201.21, 205.24; 204/230; 205/349

[56] References Cited

U.S. PATENT DOCUMENTS

| | | |
|---|---|---|
| 3,875,957 | 4/1975 | Veit et al. . |
| 4,036,253 | 7/1977 | Fegan et al. . |
| 4,725,824 | 2/1988 | Yoshioka . |
| 4,728,939 | 3/1988 | Otani . |
| 4,848,333 | 7/1989 | Waite . |
| 4,953,111 | 8/1990 | Yamamoto et al. . |
| 5,037,518 | 8/1991 | Young et al. . |
| 5,372,129 | 12/1994 | Ryder . |
| 5,589,052 | 12/1996 | Shimamune et al. . |
| 5,690,797 | 11/1997 | Harada et al. . |
| 5,706,801 | 1/1998 | Remes et al. . |
| 5,729,619 | 3/1998 | Puma . |

*Primary Examiner*—Nina Tong
*Attorney, Agent, or Firm*—David W. Brownlee; Eckert Seamans Cherin & Mellott LLC

[57] ABSTRACT

This invention provides supplemental oxygen to the passenger compartment of wheeled vehicles to reduce drowsiness of drivers of wheeled vehicles so as to reduce the number of accidents caused by drowsy drivers. The invention also makes drivers and passengers in wheeled vehicles more alert and feel better by increasing the percentage of oxygen in the passenger compartments of wheeled vehicles to a beneficial and safe level.

12 Claims, 2 Drawing Sheets

OXYGEN ENRICHMENT SYSTEM FOR WHEELED VEHICLES CROSS-REFERENCE TO RELATED APPLICATIONS

CROSS-REFERENCE TO RELATED APPLICATION

This is a continuation-in-part of application Ser. No. 09/135,927, filed Jan. 18, 1998, and entitled "Oxygen Supply System for Wheeled Vehicles" now U.S. Pat. No. 5,910,773.

BACKGROUND OF THE INVENTION

1. Field of the Invention

This invention relates to wheeled vehicles such as cars, trucks, tractors and buses and in particular to a system for supplying oxygen to the passenger compartments in such vehicles. The system either generates oxygen from water using electricity from the vehicle's alternator or generator or uses oxygen from an oxygen storage tank(s) and includes a regulator for regulating the oxygen that is fed to the passenger compartment to maintain the oxygen content of the air in the compartment within an optimum range.

2. Description of the Prior Art

Many vehicular accidents are caused every year by drivers falling asleep at the wheel of their vehicles. Long hours at the wheel, the monotony of driving, and other factors result in drowsiness and accidents or near misses. Some experts have opined that more vehicular accidents are caused by sleepy drivers than by drunken drivers.

Drivers attempt to stay awake by drinking coffee, taking caffeine pills, opening the car windows, and playing the car radio loudly, among other things. Laws have been enacted that limit the hours that truckers and bus drivers can drive so as to minimize accidents caused by drowsiness. Numerous inventions have also been made for detecting drowsiness in a driver and setting off an alarm to rouse the driver. See, for example, U.S. Pat. Nos. 4,725,824; 4,728,939; 4,953,111; and 5,729,619. However, none of these things has been effective to significantly reduce the number of accidents caused by sleepy drivers.

Accordingly, an improved system is needed for reducing drowsiness of drivers and reducing accidents caused by sleepy drivers.

SUMMARY OF THE INVENTION

The present invention increases alertness of drivers of wheeled vehicles so as to reduce the number of accidents caused by drowsy drivers. The invention also makes drivers and passengers in wheeled vehicles more alert and feel better by improving the percentage of oxygen in the passenger compartments of wheeled vehicles.

The oxygen content of air that people breathe is generally about 21 percent by volume (about 23% by weight) depending on location and ambient conditions. The oxygen content of most ambient air has decreased slightly during the last couple of centuries. This may be a result of reductions in plant life and/or increases in the use of fossil fuels, among other factors. The oxygen content in some places such as office buildings, buses, cars and other closed or partially closed compartments is usually less than the oxygen content of outside air.

This invention may include an electrolyzing system for evolving gaseous oxygen from water and feeding the oxygen into the passenger compartment of a wheeled vehicle, or may use oxygen from a storage tank or tanks carried by the vehicle. The invention detects the oxygen content of the air in the passenger compartment and controls the oxygen supply to regulate the oxygen flow into the compartment. The system can be set to flow oxygen-enriched air into the compartment if the percent of oxygen-enriched air in the compartment falls to or below a preselected value and shut off the supply of oxygen when the oxygen content rises to a preselected value. The system preferably includes a diluter to reduce the concentration of the oxygen that is supplied into the passenger compartment. As used herein, the phrase "wheeled vehicle" is used to mean a vehicle that operates mainly on land and has wheels on it for supporting and propelling the vehicle.

The optimum percent of oxygen in the passenger compartment for reduced drowsiness and increased alertness need be only a few percent above the percent of oxygen in ambient air. It is believed that raising the percent oxygen to a range of about 23–25% by volume can substantially increase the alertness of people breathing the air. It is important to keep the oxygen content in the passenger compartment from exceeding approximately 25% by volume to avoid a possible risk of fire hazard in the compartment.

This invention provides a convenient and inexpensive system for providing a small increase in the oxygen content of air in passenger compartments. The invention provides a system that helps drivers and passengers remain alert and maintain well-being. This invention reduces drowsiness of drivers and reduces accidents caused by drowsiness.

The above and other objects and advantages of this invention will be more fully understood and appreciated by reference to the following description and the drawings which form a part hereof.

DESCRIPTION OF A PREFERRED EMBODIMENT

Figure 1:
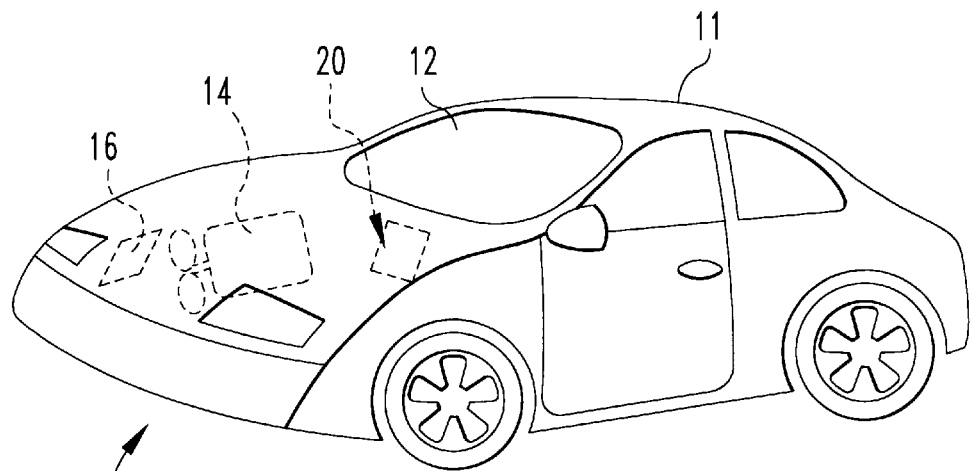
FIG. 1 is a schematic representation of a wheeled vehicle having a system for providing oxygen to passenger compartments in accordance with this invention.

FIG. 1 depicts an automobile 10, as a typical wheeled vehicle, which is suitable for use of the present invention. Other wheeled vehicles having driver/passenger compartments that can benefit from this invention includes trucks, buses, tractors, and rail cars such as trains and subway vehicles. The car 10 has a body 11 with a passenger compartment 12, an internal combustion engine or motor 14 and an electricity generating system 16. The electricity generating system 16 may be a conventional generator, an alternator or other like devices which are driven by the internal combustion engine 14 and produce electricity for a variety of uses such as lights, radio, starter, horn, etc., not shown.

In accordance with this invention the car 10 or other wheeled vehicle preferably has a system 20 for producing and supplying oxygen-enriched air supply to the passenger compartment 12. The system 20 can be located in the car 10 at a variety of locations such as the fire wall of the engine compartment, as shown in FIG. 1, or other locations in the engine compartment, passenger compartment 12 or trunk.

Figure 2:
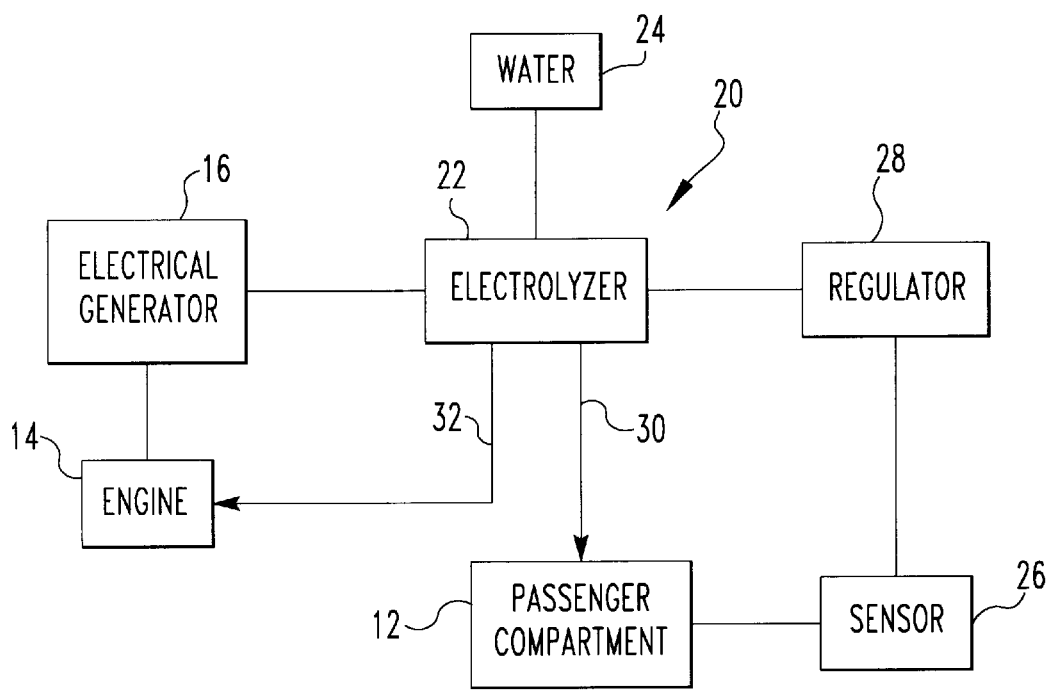
FIG. 2 is a flow diagram of an oxygen supply system for a wheeled vehicle in accordance with this invention.

As shown in FIG. 2, the oxygen generating system 20 preferably comprises an electrolyzing unit 22, a container 24 for water, a sensor 26 and a regulator 28. The system preferably uses deionized or distilled water to avoid or minimize build-up of scale and debris in the electrolyzer 22. Electrolyzing devices are well known in the art as is disclosed in U.S. Pat. Nos. 5,037,518; 5,589,052; and 5,690,797, the disclosures of which are incorporated herein by reference. Such electrolyzing systems can generate high purity gases under pressure in a safe manner without need for gas compressors. Apparatus for generating gaseous oxygen are available from companies such as Packard Instrument Company of Downers Grove, Ill.

The electrolyzer 22 produces gaseous hydrogen, as well as oxygen. The hydrogen gas may be used as a supplement fuel for the internal combustion engine, or can alternatively be exhausted to the atmosphere. The hydrogen gas is produced in relatively small quantities, and can be safely and easily dispersed into the ambient air. However, use of hydrogen as a fuel supplement for the engine may be desirable to make the system more cost effective.

The system further has a pipe 30 or other conduit device for flow of oxygen to the passenger compartment and a pipe 32 for flow of hydrogen to the engine or to an outside vent. The generation of oxygen and hydrogen by the electrolyzer 22 can produce sufficient gas pressure to move the gases through the pipes without need for a compressor, fan or other such device, but such flow-enhancing devices are not excluded from use in this invention.

It is important that the system 20 include an oxygen sensor 26 or other measuring device for sensing and measuring the oxygen content in the air in the passenger compartment 12. Oxygen sensors are well known in the art as disclosed by U.S. Pat. Nos. 5,036,852 and 5,706,801, the disclosures of which are incorporated herein by reference. Oxygen concentration sensors are available from Douglas Scientific of Kansas City, Kans. among other companies.

The system further includes a regulator 28 for regulating or controlling the flow of oxygen from the electrolyzer 22 through pipe 30 into the passenger compartment 12. The regulator 28 receives the measurement from sensor 26 and operates much like a thermostat to regulate oxygen flow. The regulator starts the flow of oxygen when the percent oxygen concentration in the passenger compartment 12 falls to or below a preselected percent, such as 20% by volume, and stops the flow when the concentration rises to a preselected percent such as 24 or 25% by volume.

For safety reasons, it is critical that the second preselected oxygen content for shutting the electrolyzer off be at a safe level which does not create a risk of rapid combustion of lighted objects such as cigarettes or other combustibles that might be intentionally or accidentally ignited in the passenger compartment. However, significant increases in driver alertness and reductions in drowsiness should result from small increases (such as 2–4% increases) in the oxygen content in the passenger compartment. Such small increases are safely below an oxygen level of about 25% by volume that might be hazardous.

The regulator 28 can optionally regulate the flow of oxygen-enriched air to the passenger compartment 12 either by switching the electrolyzer 22 on and off or by operating a valve, not shown, which controls the oxygen-enriched air flow into the passenger compartment or to another destination such as a storage tank or an exhaust outlet. Computer controlled regulators for such purposes are well known in the art.

The system also preferably includes an oxygen dilution device, not shown, for diluting the concentration of the oxygen in the air that is fed into the passenger compartment through conduit 30. Diluter devices are well known in the art as, for example, are disclosed by U. S. Pat. Nos. 3,875,957; 4,036,253; 4,848,333; and 5,372,129, the disclosures of which are incorporated by reference. The dilution device reduces the concentration of oxygen from approximately 100%, as it comes from the electrolyzer 22, down to approximately 28–35% oxygen, so it can be safety fed into the passenger compartment 12. The diluter can use outside (fresh) air or recirculated air from the passenger compartment for mixing with the oxygen to dilute it. Dilution of the oxygen is desirable to reduce the possibility that highly concentrated oxygen could be a fire hazard if it contacts oil, lipstick or other combustibles in the passenger compartment. It may also be desirable that the outlet for feeding oxygen enriched air into the passenger compartment be located such that the enriched air will not contact combustibles until the air is further diluted by air in the passenger compartment. Such location could, for example, be within an air duct in the vehicle's heater/air conditioning system.

Dilution of a gas stream containing 100% oxygen down to an oxygen enriched air stream containing about 28–35% oxygen means that the 100% oxygen is diluted with about 5–18 volumes of air depending on the oxygen content of the feed air and the desired oxygen content of the enriched air. If the feed air is outside air, it will have an oxygen content of about 20% by volume, whereas recirculated air from the passenger compartment might have up to about 24% oxygen content.

It may be desirable for the system to be limited to two settings for the dilution ratios, one when the oxygen is diluted by fresh air and the other when the oxygen is diluted by recirculated air so that the oxygen content of the enriched air never exceeds a relatively low level such as about 28–35% oxygen. Alternatively, the system may employ an oxygen sensor that detects the percent oxygen in the enriched air and a regulator to control the amount of dilution to a predetermined safe percent. This offers the further advantage of increased effectiveness while minimizing risks of fire hazard. The dilution level could be maintained at a level which would safely and quickly raise the oxygen content in the passenger compartment without need for excessive air flow. If the enriched air has a low oxygen content, such as about 25–28%, then excessive air flow might be required to raise the oxygen content of the air in the passenger compartment to a desired level of about 24% within a reasonable period of time.

Figure 3:
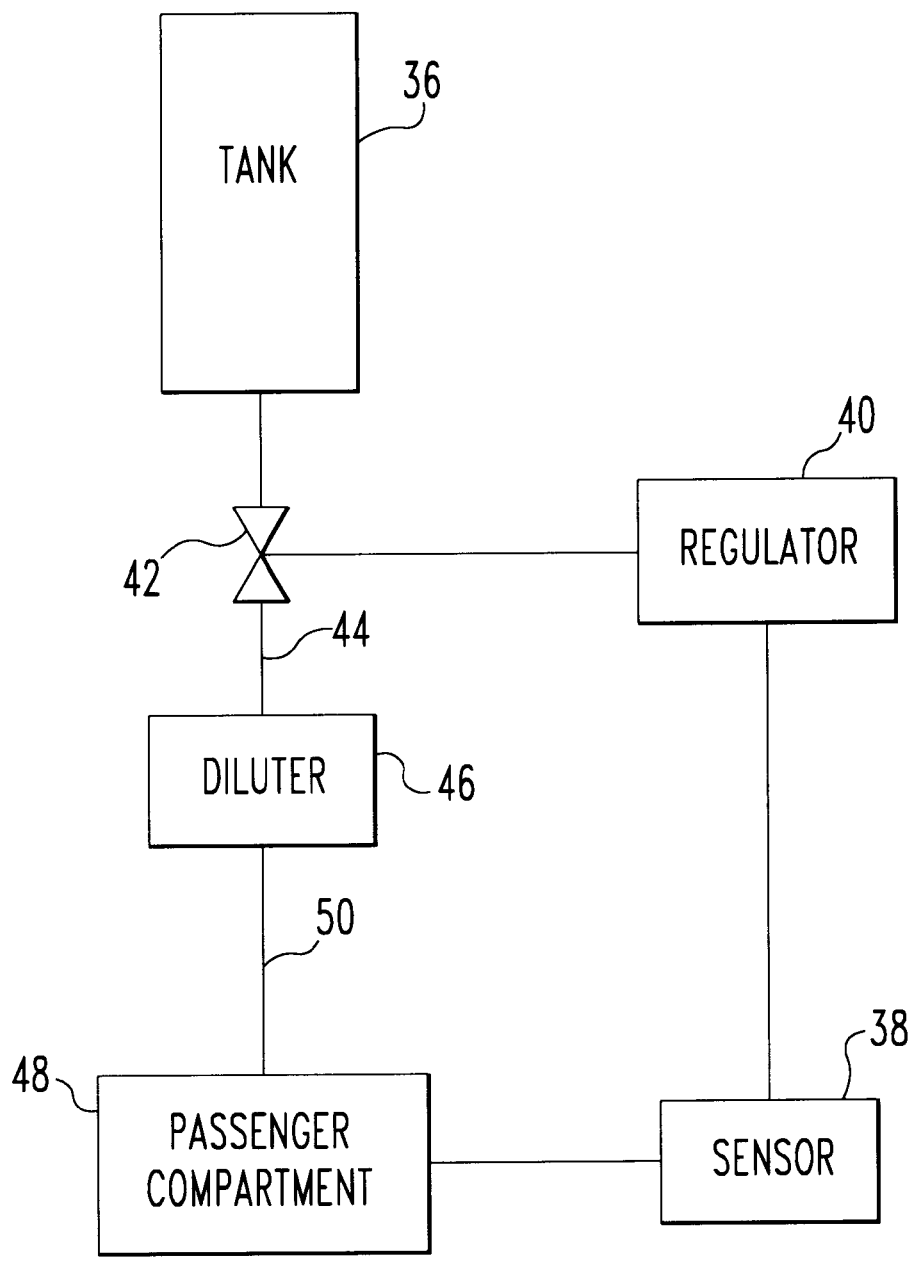
FIG. 3 is a flow diagram of an alternative oxygen supply system for a wheeled vehicle in accordance with this invention.

FIG. 3 shows an alternate embodiment of an oxygen supply system 34 for a wheeled vehicle that uses oxygen from a take(s) 36. The system 34 includes a sensor 38 for measuring the oxygen content in the passenger compartment, a regulator 40 for opening and closing a valve 42 and feeding oxygen into conduit 44, and a diluter 46 for diluting the oxygen before it is fed through conduit 50 into the passenger compartment 48. The tank or tanks 36 may be carried in the trunk of a passenger vehicle or a storage compartment in other wheeled vehicles. The system 34 works much like the system 20 of FIGS. 1 and 2 to enrich the oxygen content of the air in a passenger compartment to a safe level that helps keep drivers and passengers more alert and less likely to fall asleep and cause accidents.

It is therefore seen that this invention provides a system for supplying a beneficial quantity of oxygen-enriched air to the passenger/driver compartment of a wheeled vehicle in a safe and efficient manner. The system can potentially prevent many accidents caused by sleepy drivers and also improve the well-being of the driver and passengers in vehicles.

Although a preferred embodiment of this invention has been selected for purposes of illustration and explanation, numerous modifications can be made to such preferred embodiment without departing from the invention or the scope of the claims appended hereto. For example, a wheeled vehicle utilizing this invention could be powered by an electric motor or by a hybrid drive system that includes both an electric motor and an internal combustion engine or motor instead of solely by an internal combustion engine. This invention could also be used in boats, ships, office buildings, homes or businesses in which it is desirable to enhance the alertness and general well being of people in them.

What is claimed is:

1. In a wheeled vehicle having a passenger compartment and a motor for propelling the vehicle, the improvement comprising a system for supplying oxygen-enriched air to said passenger compartment including:

a supply of oxygen;

a diluter for mixing oxygen from said supply of oxygen with an air supply to produce oxygen-enriched air;

a conduit for flowing said oxygen-enriched air into said passenger compartment;

an oxygen concentration detection device for detecting the oxygen content of air in said passenger compartment; and a regulator for regulating the flow of oxygen-enriched air into said passenger compartment to commence the flow when the oxygen content in said passenger compartment falls below a first preselected level and to stop the flow when the oxygen content in said compartment rises to a second preselected level.

2. A wheeled vehicle as set forth in claim 1, which comprises a passenger car.

3. A wheeled vehicle as set forth in claim 1, which comprises a truck.

4. A wheeled vehicle as set forth in claim 1, which comprises a bus.

5. A wheeled vehicle as set forth in claim 1 which includes a sensor for measuring the oxygen content of said oxygen-enriched air and a regulator for maintaining said oxygen content of the oxygen-enriched air at a third preselected level.

6. A wheeled vehicle as set forth in claim 1 in which said second preselected level is about 24–25% by volume.

7. A wheeled vehicle as set forth in claim 1 in which said supply of oxygen includes at least one oxygen tank.

8. A wheeled vehicle as set forth in claim 1 in which said supply of oxygen comprises apparatus for electrolyzing water into gaseous oxygen and hydrogen.

9. A system for supplying gaseous oxygen to a passenger compartment in a wheeled vehicle having an internal combustion engine and an electricity generating device, comprising:

an oxygen supply system;

a diluter for mixing oxygen from said oxygen supply system with an air supply to produce an oxygen-enriched air supply;

a conduit for flowing said oxygen-enriched air into said passenger compartment;

an oxygen concentration measuring device for measuring the oxygen content of air in said passenger compartment; and a regulator for regulating the flow of said oxygen-enriched air into said passenger compartment so as to commence the flow when the oxygen content in said compartment falls below about 20–21 percent by volume and to stop the flow when the oxygen content rises to about 24–25 percent by volume.

10. A system as set forth in claim 9 which includes means for regulating the oxygen content of said oxygen-enriched air that is fed into said passenger compartment.

11. A system as set forth in claim 9 that includes at least one oxygen storage tank in said oxygen supplying system.

12. A system as set forth in claim 11 in which said oxygen supply system comprises apparatus for electrolyzing water into oxygen and hydrogen.

* * * * *